(12) United States Patent
Delker et al.

(10) Patent No.: US 8,180,386 B1
(45) Date of Patent: May 15, 2012

(54) PROMOTING PUSH-TO-TALK COMMUNICATION

(75) Inventors: Jason R. Delker, Olathe, KS (US);
Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 388 days.

(21) Appl. No.: 12/494,025

(22) Filed: Jun. 29, 2009

(51) Int. Cl.
*H04B 7/00* (2006.01)

(52) U.S. Cl. ....... 455/518; 455/519; 455/90.2; 455/415; 370/401

(58) Field of Classification Search .......... 455/518, 455/519, 550.1, 466, 416, 563, 414.1, 41.2, 455/564, 567, 418, 90.2, 413, 412.1, 410, 455/445, 415, 566; 370/389, 352, 328, 401, 370/338; 709/203, 204, 202, 227, 223, 201
See application file for complete search history.

(56) References Cited

U.S. PATENT DOCUMENTS

| | | | | |
|---|---|---|---|---|
| 7,107,017 | B2 * | 9/2006 | Koskelainen et al. | 455/90.2 |
| 7,466,810 | B1 * | 12/2008 | Quon et al. | 379/201.01 |
| 2007/0150444 | A1 * | 6/2007 | Chesnais et al. | 707/3 |
| 2007/0153752 | A1 * | 7/2007 | Donnellan | 370/338 |
| 2007/0155416 | A1 * | 7/2007 | Donnellan | 455/518 |
| 2007/0266077 | A1 * | 11/2007 | Wengrovitz | 709/203 |
| 2008/0101340 | A1 * | 5/2008 | Bernath | 370/352 |
| 2008/0205608 | A1 * | 8/2008 | Tal et al. | 379/93.01 |
| 2009/0111509 | A1 * | 4/2009 | Mednieks et al. | 455/552.1 |
| 2009/0147778 | A1 * | 6/2009 | Wanless et al. | 370/389 |
| 2009/0156246 | A1 * | 6/2009 | Toba | 455/518 |
| 2009/0186606 | A1 * | 7/2009 | Agarwal et al. | 455/416 |
| 2009/0215486 | A1 * | 8/2009 | Batni et al. | 455/550.1 |
| 2010/0048235 | A1 * | 2/2010 | Dai et al. | 455/518 |
| 2010/0124915 | A1 * | 5/2010 | Haitani et al. | 455/415 |
| 2010/0161728 | A1 * | 6/2010 | Drozt et al. | 709/204 |
| 2011/0264733 | A1 * | 10/2011 | Klassen et al. | 709/203 |

OTHER PUBLICATIONS

Patent Application entitled, "Push-To-Talk Voice Messages," by Michael A. Gailloux, et al., filed Oct. 5, 2009 as U.S. Appl. No. 121573,741.

* cited by examiner

*Primary Examiner* — Tan Trinh (57) ABSTRACT

A system is provided for promoting push-to-talk communication. An exchange component identifies a voice call between a first mobile device and a second mobile device. The exchange component determines whether the first mobile device selects to share a first push-to-talk contact identifier associated with the first mobile device with other mobile devices. If the first mobile device selects to share the first push-to-talk contact identifier, the component determines whether the second mobile device selects to share a second push-to-talk contact identifier associated with the second mobile device with other mobile devices. If the second mobile device selects to share the second push-to-talk contact identifier, the component communicates the second push-to-talk contact identifier to the first mobile device and the first push-to-talk contact identifier to the second mobile device.

20 Claims, 6 Drawing Sheets

PROMOTING PUSH-TO-TALK COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Push-to-talk, also known as press-to-transmit, is a method of conversing on half-duplex communication lines using a momentary button to switch from voice reception mode to transmit mode. Push-to-talk, or push-to-talk over cellular, may be provided over a mobile device communication network as a feature similar to a "walkie-talkie." A mobile device may be a mobile phone, a wireless communication device, a pager, a personal digital assistant, a portable computer, a tablet computer, a laptop computer, a digital camera, a digital music player, a digital calculator, an electronic key fob for keyless entry, a media player, or an inventory control device.

A typical push-to-talk connection connects almost instantly. One significant advantage of push-to-talk is allowing a single person to reach an active talk group at a button press, thus users no longer need to make several calls to coordinate with a group. Push-to-talk calls are half duplex communications—while one person speaks, the other(s) listen. Traditional mobile phone networks and devices utilize full-duplex communications, allowing customers to call other persons on a mobile or land-line network and be able to simultaneously talk and hear the other party. Full-duplex communications require a connection to be started by dialing a phone number and the other party answering the call, and the connection remains active until either party ends the call or the connection is dropped due to signal loss or a network outage. Full-duplex communications typically do not allow for casual transmissions to be sent to other parties on the network without first dialing them up, as is provided by two-way radios. Full-duplex operation on mobile phone networks is made possible by using separate frequencies for transmission and reception. Some mobile device communication providers offer mobile push-to-talk service via functionality for individual half-duplex transmissions that are being sent to another party on the system without needing an existing connection to be already established. Since such communications are half-duplex, utilizing a single frequency, only one user can transmit by push-to-talk at a time; such that the other party is unable to transmit until the transmitting user un-keys their push-to-talk button.

SUMMARY OF THE INVENTION

In some embodiments, a system is provided for promoting push-to-talk communication. The system includes a processor and an exchange component. When executed by the processor, the exchange component identifies a voice call between a first mobile device and a second mobile device. The exchange component determines whether the first mobile device selects to share a first push-to-talk contact identifier associated with the first mobile device with other mobile devices. If the first mobile device selects to share the first push-to-talk contact identifier with other mobile devices, the exchange component determines whether the second mobile device selects to share a second push-to-talk contact identifier associated with the second mobile device with other mobile devices. If the second mobile device selects to share the second push-to-talk contact identifier with other mobile devices, the exchange component communicates the second push-to-talk contact identifier to the first mobile device and communicates the first push-to-talk contact identifier to the second mobile device.

In some embodiments, a method is provided for promoting push-to-talk communication. A connection request associated with an entered number for a voice call from a first mobile device to a second mobile device is intercepted. A determination is made whether the first mobile device is associated with a first push-to-talk contact identifier and the second mobile device is associated with a second push-to-talk contact identifier. If the first mobile device is associated with the first push-to-talk contact identifier and the second mobile device is associated with the second push-to-talk contact identifier, an option is provided to the first mobile device to communicate with the second mobile device via the second push-to-talk contact identifier. A determination is made whether the option is selected. If the option is selected, the first mobile device communicates with the second mobile device via the second push-to-talk contact identifier.

In some embodiments, a system is provided for promoting push-to-talk communication. The system includes a processor and an exchange component. When executed by the processor, the exchange component identifies a voice call between a first mobile device and a second mobile device. The exchange component prompts the second mobile device to select to share a second push-to-talk contact identifier associated with the second mobile device with the first mobile device and determines whether the second mobile device selects to share the second push-to-talk contact identifier with the first mobile device. If the second mobile device selects to share the second push-to-talk contact identifier with the first mobile device, the exchange component prompts the first mobile device to select whether to share a first push-to-talk contact identifier associated with the first mobile device with the second mobile device. If the first mobile device selects to share the first push-to-talk contact identifier with the second mobile device, the exchange component communicates the second push-to-talk contact identifier to the first mobile device and communicates the first push-to-talk contact identifier to the second mobile device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Many people may use a mobile device with push-to-talk capabilities yet never use their mobile device's push-to-talk capabilities. One reason for this lack of push-to-talk use may be that a user of a mobile device with push-to-talk capabilities may not be aware of which mobile devices with which the user communicates also have push-to-talk capabilities. Even if such a user is aware of which mobile devices with which the user communicates also have push-to-talk capabilities, the user may not be aware that the user may need to share their push-to-talk contact identifier with the other mobile devices in order to receive push-to-talk communications from the other mobile devices. The user may also be unaware that the user may need to have push-to-talk contact identifiers for the other mobile devices in order to transmit push-to-talk communications to the other mobile devices. Push-to-talk contact identifiers may be urban fleet market identifiers (UFMID's), which are a series of characters that may be used to enable push-to-talk communications between mobile devices similar to the use of telephone numbers that enable voice calls between mobile devices.

Another reason that the user may be unaware that the user's mobile device may need to exchange push-to-talk contact identifiers with other mobile devices may be if the user's mobile device enables push-to-talk communication via one technology network and communicates voice calls via a second technology network. For example, the user's mobile device may enable push-to-talk communication via an integrated digital enhanced network (IDEN) communication technology, a code division multiple access (CDMA) technology, or a voice-over Internet Protocol (VoIP) technology. In another example, the user's mobile device may communicate voice calls via a CDMA technology, a global system for mobile communication (GSM) technology, a universal mobile telecommunications system (UMTS) technology, or a worldwide interoperability for microwave access (WiMAX) technology. If the user's mobile device uses two different technologies for voice calls and push-to-talk communication, having another mobile device's telephone number in a contact list may not result in also having access to the push-to-talk contact identifier for the other mobile device.

Systems and methods are provided for push-to-talk contact identifier exchange following voice calls. An exchange component identifies a voice call between a first mobile device and a second mobile device. For example, the exchange component identifies that the first mobile device receives an input to call the second mobile device, identifies a current voice call between the first mobile device and the second mobile, or identifies that the first mobile device discontinues the voice call with the second mobile device. The exchange component determines whether each mobile device has individually selected to share their own push-to-talk contact identifier with other mobile devices. If both mobile devices have individually selected to share their own push-to-talk contact identifier with other mobile devices, the exchange component enables the first mobile device's push-to-talk contact identifier to be communicated to the second mobile device and the second mobile device's push-to-talk contact identifier to be communicated to the first mobile device.

In some embodiments, the users of the mobile devices may not have already selected whether or not to share their mobile devices' push-to-talk contact identifiers with other mobile devices. When a voice call is identified between the first mobile device and the second mobile device, the exchange component may prompt the second mobile device to select whether or not to share its own push-to-talk contact identifier with the first mobile device and determine whether the second mobile device has selected to share its own push-to-talk contact identifier with the first mobile device. If the second mobile device has selected to share its own push-to-talk contact identifier with the first mobile device, the exchange component may prompt the first mobile device to select whether or not to share its push-to-talk contact identifier with the second mobile device. In an embodiment, the mobile devices are prompted to selectively share their push-to-talk contact identifiers with only one mobile device, the mobile devices associated with the voice call, but not with any other mobile devices. If the exchange component determines that the mobile devices select to share their push-to-talk contact identifiers with each other, the exchange component enables the first mobile device's push-to-talk contact identifier to be communicated to the second mobile device and the second mobile device's push-to-talk contact identifier to be communicated to the first mobile device.

In some situations the user of the first mobile device may decide in advance to share the first mobile device's push-to-talk contact identifier with other mobile devices that communicate by voice with the user's mobile device. In other situations, the user of the first mobile device may selectively decide after a voice call whether the second mobile device is identified to share the first mobile device's push-to-talk contact identifier with only one mobile device, the second mobile device. In both types of situations, the mobile devices may store each other's push-to-talk contact identifier in their own contact list to enable each mobile device to transmit push-to-talk communications to and receive push-to-talk communications from the other mobile device. The contact list may include multiple push-to-talk communication levels. One communication level may route an incoming communication such that the mobile device user and all in the user's vicinity immediately hear the communication as a typical push-to-talk communication. Another communication level may route the incoming communication such that the user immediately hears the communication as a typical mobile device voice communication while others in the user's vicinity may not hear the push-to-talk communication.

The exchange component may promote push-to-talk communication by reminding mobile device users of the option to use push-to-talk communication as an alternative to voice calls. For example, the exchange component intercepts a voice call connection request from a first mobile device to a second mobile device and determines whether each of the mobile devices is associated with their own push-to-talk contact identifier. If each of the mobile devices is associated with their own push-to-talk contact identifier, the exchange component provides an option to the first mobile device to communicate with the second mobile device via the second push-to-talk contact identifier. If the option is selected, the first mobile device communicates with the second mobile device via the second push-to-talk contact identifier.

The exchange component enables users of mobile devices with push-to-talk capabilities who are unaware of other mobile devices with push-to-talk capabilities or are forgetful of their own mobile device's push-to-talk capabilities to more fully utilize their own mobile device's push-to-talk capabilities. Utilization of the push-to-talk capabilities may also better permit load balancing between the voice network and the push-to-talk network. If calls are being blocked on the voice network because of an overload situation, a user can utilize the push-to-talk capabilities to complete a call on the push-to-talk network. The communication service provider may also have different costs or profit margins for the voice network and the push-to-talk network, and can use billing plans and promotions to provide incentives for users to achieve a preferred load balance between the two networks. The user may also benefit from more service and pricing options.

Figure 1:
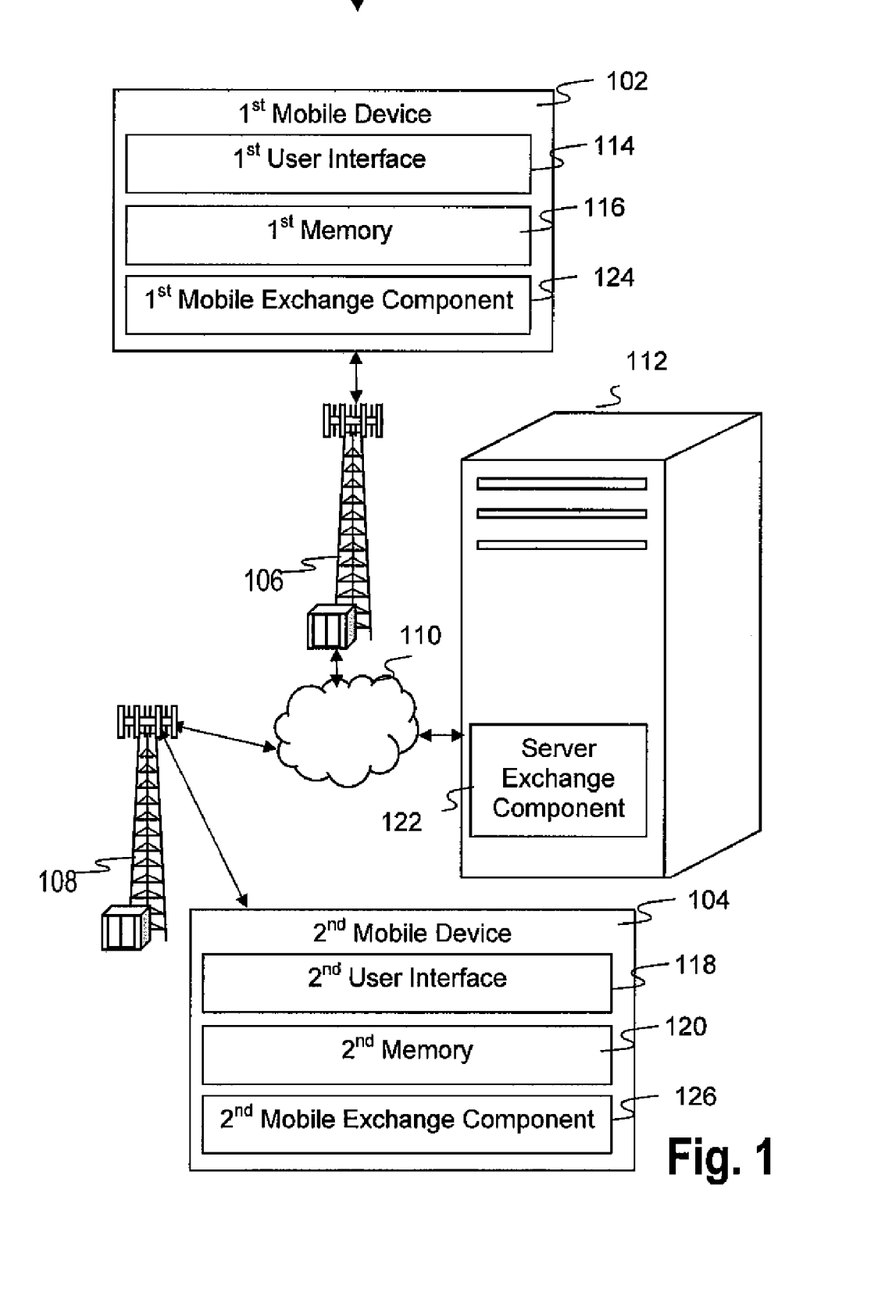
FIG. 1 shows a block diagram of a system for promoting push-to-talk communication according to some embodiments of the present disclosure.

FIG. 1 shows a block diagram of a system 100 for promoting push-to-talk communication according to some embodiments of the present disclosure. The system 100 includes a first mobile device 102, a second mobile device 104, a first base transceiver station (BTS) 106, a second BTS 108, a network 110, and a communication server 112. The first mobile device 102 and the second mobile device 104 may communicate with each other and with the communication server 112 via the BTS's 108-108 and the network 110.

The first mobile device 102 includes a first user interface 114 and a first memory 116. The second mobile device 104 includes a second user interface 118 and a second memory 120. The communication server 112 may execute a server exchange component 122, the first mobile device 102 may execute a first mobile exchange component 124, and the second mobile device 104 may execute a second mobile exchange component 126. Although some examples may describe the server exchange component 122 taking an action, and other examples may describe the mobile exchange components 124-126 taking other actions, each action in the present disclosure may be taken by the server exchange component 122, the first mobile exchange component 124, the second mobile exchange component 126, or any combination of the exchange components 122-126. The server exchange component 122 may store data that includes the push-to-talk contact identifiers for the mobile devices 102-104 and the selections by the mobile devices 102-104 to share their push-to-talk contact identifiers with other mobile devices. Therefore, the server exchange component 122 does not have to request this data from the mobile devices 102-104 to execute some actions. The mobile exchange components 124-126 may have to request some of this data from other mobile devices and/or the server exchange component 122. However, the mobile exchange components 124-126 may execute some local actions, such as identifying a voice call, that alleviate the requirement for the server exchange component 122 to monitor numerous distributed mobile devices 102-104.

The server exchange component 122 identifies a voice call between the first mobile device 102 and the second mobile device 104. For example, the exchange component identifies that the first mobile device 102 receives an input to call the second mobile device 104, identifies a current voice call between the first mobile device 102 and the second mobile 104, or identifies that the first mobile device 102 discontinues the voice call with the second mobile device 104. The server exchange component 122 may communicate with the mobile devices 102-104 to determine whether each of the mobile devices 102-104 has individually selected to share their own push-to-talk contact identifier with other mobile devices. Alternatively, the server exchange component 122 may have already stored information that indicates whether each of the mobile devices 102-104 has individually selected to share their own push-to-talk contact identifier with other mobile devices In another example, the exchange components 124-126 may communicate via data sessions with each other and/or with the server exchange component 122 to determine whether each of the mobile devices 102-104 has individually selected to share their own push-to-talk contact identifier with other mobile devices.

If both mobile devices 102-104 have individually selected to share its push-to-talk contact identifier with other mobile devices, the server exchange component 122 may enable the push-to-talk contact identifier for the first mobile device 102 to be communicated to the second mobile device 104 and the push-to-talk contact identifier for the second mobile device 104 to be communicated to the first mobile device 102. For example, the server exchange component 122 may communicate the push-to-talk contact identifier for the first mobile device 102 to the second mobile device 104 and communicate the push-to-talk contact identifier for the second mobile device 104 to the first mobile device 102. In another example, the server exchange component 122 may request the first mobile device 102 to communicate the push-to-talk contact identifier for the first mobile device 102 to the second mobile device 104 and request the second mobile device 104 to communicate the push-to-talk contact identifier for the second mobile device 104 to the first mobile device 102.

The exchange components 124-126 may also enable the push-to-talk contact identifier for the first mobile device 102 to be communicated to the second mobile device 104 and the push-to-talk contact identifier for the second mobile device 104 to be communicated to the first mobile device 102. For example, the first mobile exchange component 122 may communicate the push-to-talk contact identifier for the first mobile device 102 to the second mobile device 104 and request either the second mobile device 104 or the server exchange component 122 to communicate the push-to-talk contact identifier for the second mobile device 104 to the first mobile device 102. In another example, the second exchange component 126 may communicate the push-to-talk contact identifier for the second mobile device 104 to the first mobile device 102 and request either the first mobile device 102 or the server exchange component 122 to communicate the push-to-talk contact identifier for the first mobile device 102 to the second mobile device 104. The push-to-talk contact identifiers may be communicated via a data session or via a short message service (SMS) message sent over a mobile device wireless paging channel. Furthermore, the exchange components 122-126 may work together in any combination to transmit and request push-to-talk contact identifiers for the mobile devices 102-104.

Any of the exchange components 122-126 may promote the user interfaces 114 and 118 on the mobile devices 102-104 to display a message about the receipt of a push-to-talk contact identifier. For example, the first mobile exchange component 124 prompts the first user interface 114 to display a message that indicates a request to identify the push-to-talk contact identifier received for the second mobile device 104. The request may be to enter the name of the person with whom the voice call is associated into the contact list stored in the first memory 116 to identify the received push-to-talk contact identifier. In another example, either the server exchange component 122 or the second mobile exchange component 126 prompts the second user interface 118 to display a message that indicates a prior receipt of the push-to-talk contact identifier for the first mobile device 102. The message may indicate that a push-to-talk contact identifier already exists for the first mobile device 102 in the contact list stored in the second memory 120.

In yet another example, the first mobile exchange component 124 prompts the first user interface 114 to consider using the push-to-talk contact identifier received for the second mobile device 104 to communicate with the second mobile device 104 as an alternative to communicating with the second mobile device 104 via a voice call. The message may indicate that a push-to-talk communication may incur smaller service plan charges for the first mobile device 102 than a voice call incurs. The message may also display the remaining funds on a prepaid plan or the current monthly charges for a post-paid plan as incentives for the first mobile device 102 to communicate with the second mobile device 104 via push-to-talk communications. The message may indicate that the periodic allocation of voice minutes, for example the monthly allocation of voice minutes provided by a wireless communication service subscription plan, may be approaching exhaustion. In an embodiment, the first user interface 114 may prompt with a suggestion to communicate via push-to-talk communications when an attempt is made to initiate a voice call, before the call origination involves network equipment, for example before the call origination propagates to the base transceiver station 106 from the first mobile device 102. The prompt may include the push-to-talk contact identifier of the second mobile device 104 which may be determined by the first mobile device 102 based on the voice number initially entered into the first mobile device 102, for example by using the voice number to index into a contact list and finding the push-to-talk contact identifier of the second mobile device 104.

In another embodiment, when the second mobile device 104 originates a voice call to the first mobile device 102, the first mobile exchange component 124 may prompt with a suggestion to communicate via push-to-talk communications with the second mobile device 104 rather than via voice communications. The user of the first mobile exchange component 124 may ignore the prompt and select to receive the voice call from the second mobile device 104. Alternatively, the user of the first mobile exchange component 124 may accept the suggestion and originate a push-to-talk communication with the second mobile device 104.

In an embodiment, when the first mobile device 102 attempts to initiate a voice call to the second mobile device 104, for example by entering a voice number of the second mobile device 104, the first mobile exchange component 124 may determine that the standard wireless voice communication system currently provides poor or no coverage and may prompt with a suggestion to use push-to-talk communication to reach the second mobile device 104 instead. In an embodiment, the prompt may include the push-to-talk contact identifier of the second mobile device 104 which may be determined by the first mobile device 102 based on the voice number initially entered into the first mobile device 102, for example by using the voice number to index into a contact list and finding the push-to-talk contact identifier of the second mobile device 104. As described above, the first mobile exchange component 124 may selectively prompt with the suggestion to communicate via push-to-talk communications based on a current account balance, based on a remaining number of periodically allocated voice minutes, and/or based on a current voice wireless coverage at the first mobile device 102.

In an embodiment, when the first mobile device 102 presents a message from the second mobile device 104 on a display of the first mobile device 102, for example a text message, an email, a dialog box to select a voice message for playback, or another message, the message may be presented along with a selectable push-to-talk contact identifier of the second mobile device 104. Thus, when viewing or listening to a message from the second mobile device 104, the first mobile device 102 may provide the user with a convenient means for readily initiating a push-to-talk communication with the second mobile device 104, for example to further pursue the topic of the subject message. The first mobile exchange component 124 may use the identity of the second mobile device 104 linked to the message to index into a contacts list to determine the push-to-talk contact identifier of the second mobile device 104 for presentation in association with the message. The first mobile exchange component 126 may store the push-to-talk contact identifier for the second mobile device 104. The server exchange component 122 also may store the push-to-talk contact identifier for the second mobile device 104 and communicate the push-to-talk contact identifier for the second mobile device 104 to the first mobile device 102 in response to a request for the push-to-talk contact identifier for the second mobile device 104. Additionally, the second mobile exchange component 126 may store the push-to-talk contact identifier for the second mobile device 104 and communicate the push-to-talk contact identifier for the second mobile device 104 to the first mobile device 102 in response to a request for the push-to-talk contact identifier for the second mobile device 104.

A mobile device user may select from multiple push-to-talk communication levels when providing a name or identifier in the contact list for a received push-to-talk contact identifier. For example, the user may identify a received push-to-talk contact identifier for his employer as a critical contact, a push-to-talk contact identifier for his child as an important contact, and a push-to-talk contact identifier for a salesman as a retained contact. When push-to-talk communications are received from a critical contact, the communications may be routed as a voice communication to a mobile device speaker, such that the user and all in the user's vicinity immediately hear the communication as a typical push-to-talk communication. In an embodiment, when a push-to-talk contact identifier is automatically populated to a mobile device, the "walkie-talkie" function may be contingent on the user of the subject mobile device 102, 104 accepting the initiation of the push-to-talk session, at least in an initial first communication with the newly populated contact. This may avoid the situation, for example, where a relatively unknown contact blurts out unsuitable language or subject matter over the "walkie talkie" functionality before learning that during the day the subject user works in a staid law office.

When push-to-talk communications are received from an important contact, the communications may be routed as a voice communication to a second mobile device speaker, such that the user immediately hears the communication as a typical mobile device voice communication while others in the user's vicinity may not hear the push-to-talk communication. When push-to-talk communications are received from a retained contact, the communications may be routed as an audio signal to the second mobile device speaker, a vibration signal to a mobile device vibrator, and/or a voice communication to a mobile device voice mail storage. The user may or may not be immediately notified of the receipt of a communication from a retained contact, and may listen to the communication later at the user's convenience. The user may have initially identified the salesman as an important contact, and later identified the salesman as a retained contact due to receipt of too many relatively unimportant push-to-talk communications. A mobile device user also may select from multiple push-to-talk communication levels when providing a name or identifier in the contact list for a push-to-talk contact identifier received through other means.

In some embodiments, the user of the first mobile device 102 may not have already selected whether or not to share the push-to-talk contact identifier for the first mobile device 102 with other mobile devices. When a voice call is identified between the first mobile device 102 and the second mobile device 104, any of the exchange components 122-126 may determine whether the second mobile device 104 has selected to share its own push-to-talk contact identifier with other mobile devices.

Any of the exchange components 122-126 may determine whether the second mobile device 104 selects to share its push-to-talk contact identifier with other mobile devices by prompting the second mobile device 104 to select whether to share its push-to-talk contact identifier with only one mobile device, the first mobile device 102, but not with any other mobile devices. The second mobile device 104 may be prompted via a data session or via a SMS message sent over a mobile device wireless paging channel. Any of the exchange components 122-126 may determine whether the second mobile device 104 responds to the prompt by selecting to share its push-to-talk contact identifier with the first mobile device 102.

If the second mobile device 104 has selected to share its own push-to-talk contact identifier, any of the exchange components 122-126 may prompt the first mobile device 102 to select whether or not to share its push-to-talk contact identifier with the second mobile device 104. The first mobile device 102 may be prompted via a data session or via a SMS message sent over a mobile device wireless paging channel. The first mobile device 102 is prompted to selectively share its push-to-talk contact identifier with only one mobile device, the second mobile device 104, but not with any other mobile devices. If any of the exchange components 122-126 determine that the first mobile device 102 selects to share its push-to-talk contact identifier with the second mobile device 104, any of the exchange components 122-126 may enable the push-to-talk contact identifier for the first mobile device 102 to be communicated to the second mobile device 104 and the push-to-talk contact identifier for the second mobile device 104 to be communicated to the first mobile device 102.

In some situations the user of the first mobile device 102 may decide in advance to share the push-to-talk contact identifier for the first mobile device 102 with other mobile devices that communicate by voice with the first mobile device 102. In other situations, the user of the first mobile device 102 may selectively decide, after a voice call with the second mobile device 104 is identified, to share the push-to-talk contact identifier for the first mobile device 102 with the only one mobile device, the second mobile device 104 but not with any other mobile devices. In additional situations, the users of the first mobile device 102 and the second mobile device 104 may selectively decide before, during, or after a voice call with each other to share their push-to-talk contact identifiers with the only one mobile device, the other mobile device 104 and 102, respectively. In each of these situations, the mobile devices 102-104 may store each other's push-to-talk contact identifier in their own contact list to enable the mobile devices 102 and 104 to transmit push-to-talk communications to and receive push-to-talk communications from the mobile devices 104 and 102, respectively.

The server exchange component 122 may promote push-to-talk communication by reminding mobile device users of the option to use push-to-talk communication as an alternative to voice calls. For example, the server exchange component 122 intercepts a voice call connection request from the first mobile device 102 to the second mobile device 104 and determines whether each of the mobile devices 102-104 is associated with their own push-to-talk contact identifier. If each of the mobile devices is not associated with their own push-to-talk contact identifier, the server exchange component 122 enables the first mobile device 102 to connect to the second mobile device 104 using the entered number. But if each of the mobile devices is associated with their own push-to-talk contact identifier, the server exchange component 122 provides an option to the first user interface 114 to communicate with the second mobile device 104 via the second push-to-talk contact identifier. If the option is not selected, the server exchange component 122 enables the first mobile device 102 to connect to the second mobile device 104 using the entered number. But if the option is selected, the server exchange component 122 enables the first mobile device 102 to communicate with the second mobile device 104 via the second push-to-talk contact identifier.

The exchange component may determine whether the entered number is associated with a specified set of numbers associated with emergency services, customer service for the communication device, and/or any numbers specified by a user of the communication device for bypassing provision of the option. If the entered number is associated with a specified set of numbers, the exchange component may not provide the option to the first user interface 114 to communicate with the second mobile device 104 via the second push-to-talk contact identifier. For example, if a wife knows that her husband's mobile phone uses push-to-talk capabilities for work, and the wife only calls the husband for personal reasons, the wife can specify the husband's mobile phone number for bypassing the presentation of the option, such that the wife does not see the push-to-talk option presented whenever the wife calls the husband.

The exchange components 122-126 may enable users of the mobile devices 102-104 with push-to-talk capabilities who are unaware of other mobile devices with push-to-talk capabilities or are forgetful of their own mobile device's push-to-talk capabilities to more fully utilize the push-to-talk capabilities of the mobile devices 102-104. Utilization of the push-to-talk capabilities may also better permit load balancing between the voice network and the push-to-talk network. If calls are being blocked on the voice network because of an overload situation, a user can utilize the push-to-talk capabilities to complete a call on the push-to-talk network. The communication service provider may also have different costs or profit margins for the voice network and the push-to-talk network, and can use billing plans and promotions to provide incentives for users to achieve a preferred load balance between the two networks. The user may also benefit from more service and pricing options.

Figure 2:
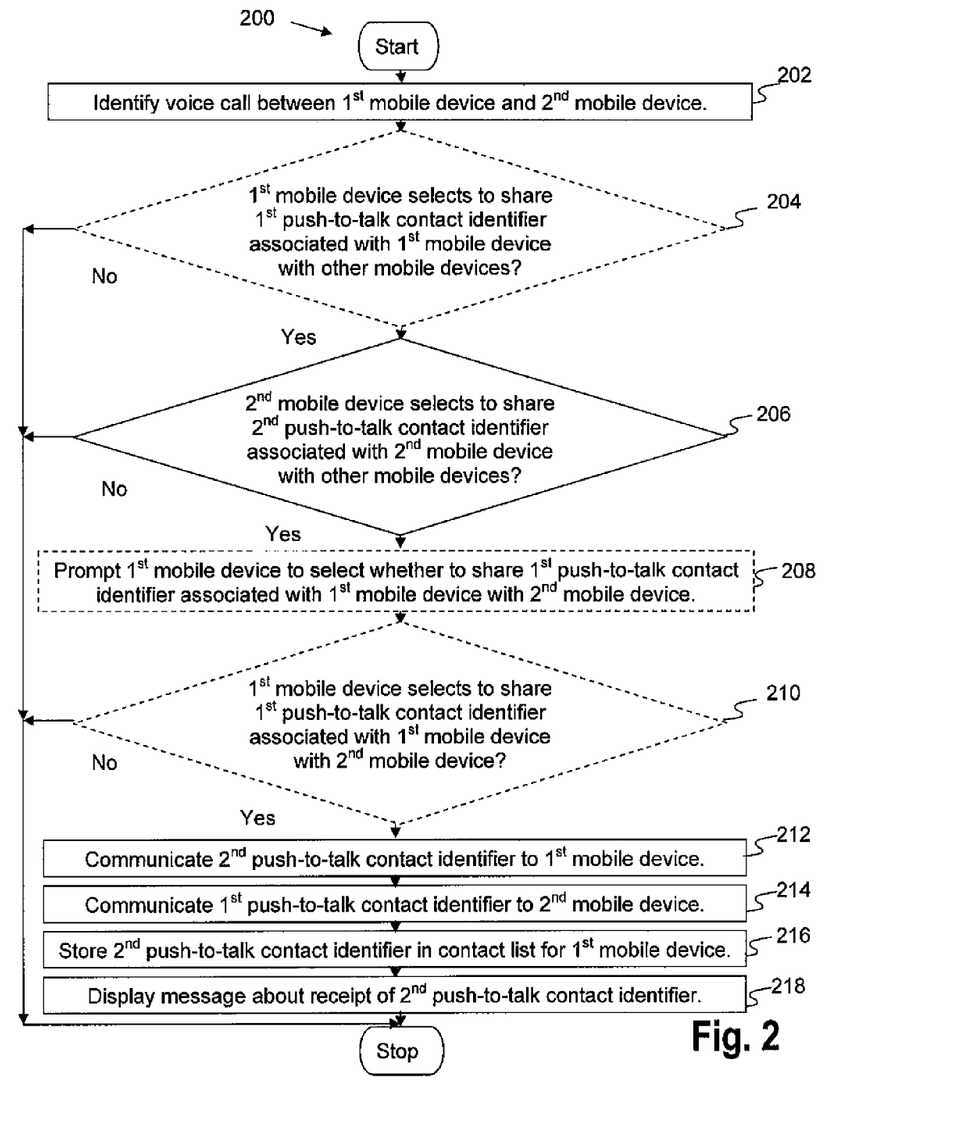
FIG. 2 shows a flowchart of a method for promoting push-to-talk communication according to some embodiments of the present disclosure.

FIG. 2 shows a flowchart of a method 200 for promoting push-to-talk communication according to some embodiments of the present disclosure. The system 100 can execute the method 200 to exchange push-to-talk contact identifier between the mobile devices 102-104 when a voice call is identified for the mobile devices 102-104.

In box 202, a voice call between a first mobile device and a second mobile device is identified. For example, the server exchange component 122 identifies a voice call between the first mobile device 102 and the second mobile device 104.

In box 204, a determination is optionally made whether a first mobile device selects to share a first push-to-talk contact identifier associated with the first mobile device with other mobile devices. For example, the server exchange component 122 determines whether the first mobile device 102 has previously selected to share its push-to-talk contact identifier with other push-to-talk capable mobile devices that conduct voice calls with the first mobile device 102. If the first mobile device 102 has previously selected to share its push-to-talk contact identifier with other mobile devices, the method 200 continues to box 206. If the first mobile device 102 has not previously selected to share its push-to-talk contact identifier with other mobile devices, the method 200 terminates.

In box 206, a determination is made whether a second mobile device selects to share a second push-to-talk contact identifier associated with the second mobile device with other mobile devices. For example, the server exchange component 122 determines whether the second mobile device 104 selects to share its push-to-talk contact identifier with other push-to-talk capable mobile devices that conduct voice calls with the second mobile device 104. If the second mobile device 104 selects to share its push-to-talk contact identifier with other mobile devices, the method 200 continues to box 208. If the second mobile device 104 does not select to share its push-to-talk contact identifier with other mobile devices, the method 200 terminates.

In box 208, a first mobile device is optionally prompted to select whether to share a first push-to-talk contact identifier associated with the first mobile device with a second mobile device. For example, when the voice call is identified, the server exchange component 122 prompts the first mobile device 102 to select whether to share its push-to-talk contact identifier with the second mobile device 104.

In box 210, a determination is optionally made whether a first mobile device selects to share a first push-to-talk contact identifier associated with the first mobile device with a second mobile device. For example, the server exchange component 122 determines whether the first mobile device 102 selects to share its push-to-talk contact with the second mobile device 104. If the first mobile device 102 selects to share its push-to-talk contact identifier with the second mobile device 104, the method 200 continues to box 212. If the first mobile device 102 does not select to share its push-to-talk contact identifier with the second mobile device 104, the method 200 terminates.

In box 212, a second push-to-talk contact identifier is communicated to a first mobile device. For example, the server exchange component 122 communicates the push-to-talk contact identifier for the second mobile device 104, which the server exchange component 122 may store for such purposes, to the first mobile device 102. Alternatively, the second mobile exchange component 126 communicates the push-to-talk contact identifier for the second mobile device 104 to the first mobile device 102.

In box 214, a first push-to-talk contact identifier is communicated to a second mobile device. For example, the server exchange component 122 communicates the push-to-talk contact identifier for the first mobile device 102 to the second mobile device 104.

In box 216, a second push-to-talk contact identifier is stored in a contact list for a first mobile device. For example, the first mobile device 102 stores the push-to-talk contact identifier for the second mobile device 104 in a contact list in the first memory 116. Similarly, the second mobile device 104 may store the push-to-talk contact identifier for the first mobile device 102 in a contact list in the second memory 120.

In box 218, a message is displayed about receipt of a second push-to-talk contact identifier. For example, the first user interface 114 displays a message about receipt of the second push-to-talk contact identifier.

Figure 3:
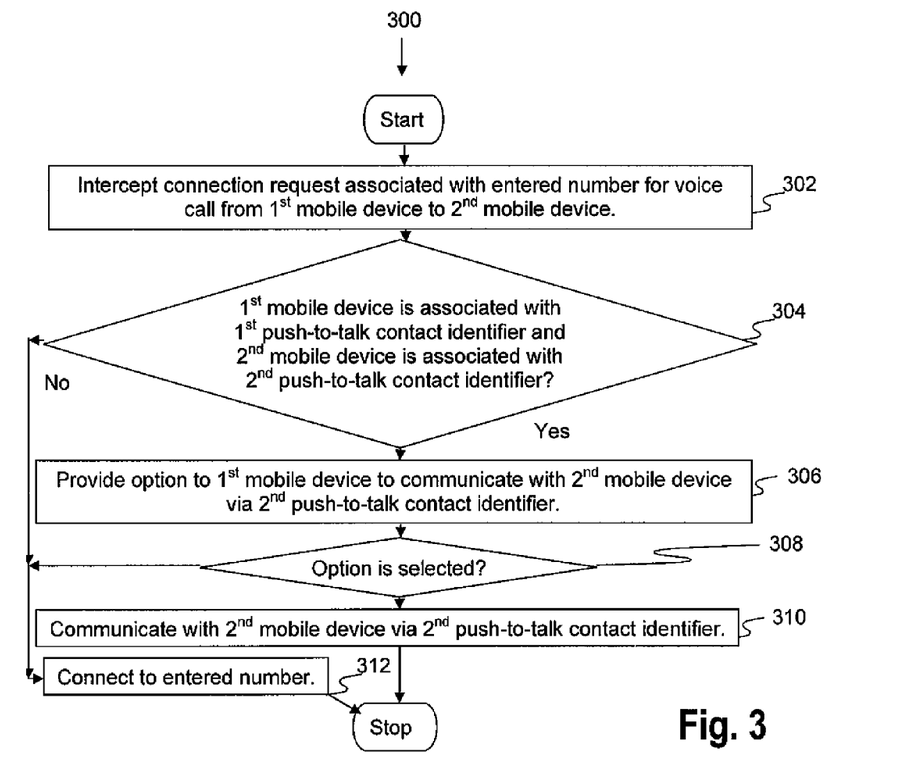
FIG. 3 shows a flowchart of a method for promoting push-to-talk communication according to some embodiments of the present disclosure.

FIG. 3 shows a flowchart of a method 300 for promoting push-to-talk communication according to some embodiments of the present disclosure. The system 100 can execute the method 300 to provide an option to communicate via push-to-talk as an alternative to a voice call.

In box 302, a connection request associated with an entered number for a voice call from a first mobile device to a second mobile device is Intercepted. For example, the server exchange component 122 intercepts a connection request associated with an entered number for a voice call from the first mobile device 102 to the second mobile device 104.

In box 304, a determination is made whether a first mobile device is associated with a first push-to-talk contact identifier and a second mobile device is associated with a second push-to-talk contact identifier. For example, the server exchange component 122 determines whether the first mobile device 102 is associated with a first push-to-talk contact identifier and the second mobile device 104 is associated with a second push-to-talk contact identifier. If each of the mobile devices 102-104 is not associated with their own push-to-talk contact identifier, the method 300 proceeds to box 312. If each of the mobile devices 102-104 is associated with their own push-to-talk contact identifier, the method 300 continues to box 306.

In box 306, an option is provided to a first mobile device to communicate with a second mobile device via a second push-to-talk contact identifier. For example, the server exchange component 122 provides an option to the first mobile device 102 to communicate with the second mobile device 104 via the second push-to-talk contact identifier.

In box 308, a determination is made whether an option is selected. For example, the server exchange component 122 determines whether the option is selected. If the option is not selected, the method 300 proceeds to box 312. If the option is selected, the method 300 continues to box 310.

In box 310, a first mobile device communicates with a second mobile device via a second push-to-talk contact identifier. For example, the server exchange component 122 enables the first mobile device 102 to communicate with the second mobile device 104 via the second push-to-talk contact identifier, and the method 300 terminates.

In box 312, a first mobile device connects to an entered number. For example, the server exchange component 122 enables the first mobile device 102 to connect to the entered number.

Figure 4:
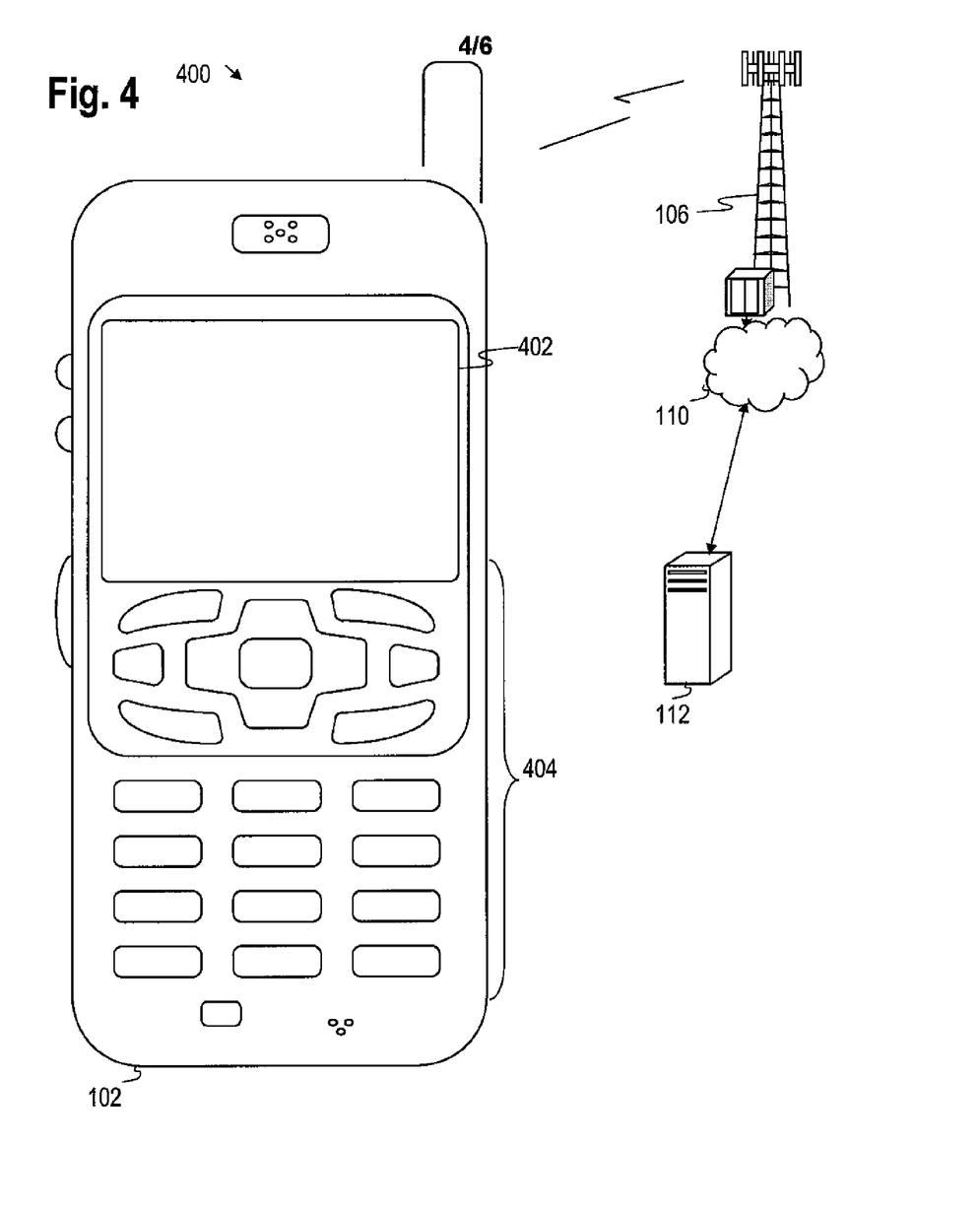
FIG. 4 shows an illustrative wireless communications system.

FIG. 4 shows a wireless communications system 400 including the first mobile device 102. FIG. 4 depicts the first mobile device 102, which is operable for implementing aspects of the present disclosure, but the present disclosure should not be limited to these implementations. Though illustrated as a mobile phone, the first mobile device 102 may take various forms including a telephone, a mobile phone, a wireless mobile device, a pager, a personal digital assistant (PDA), a portable computer, a tablet computer, a laptop computer, a digital camera, a digital music player, a digital calculator, an electronic key fob for keyless entry, a media player, an inventory control device, and a desktop phone. Many suitable mobile devices 102 combine some or all of these functions. In some embodiments of the present disclosure, the first mobile device 102 is not a general purpose computing device, but rather is a special-purpose communications device such as a mobile phone, wireless communication device, pager, or PDA. The first mobile device 102 may support specialized activities such as gaming, inventory control, job control, and/or task management functions, and so on.

The first mobile device 102 includes the user interface 114, which may include a display 402 and a touch-sensitive surface or keys 404 for input by a user. The first mobile device 102 may present options for the user to select, controls for the user to actuate, and/or cursors or other indicators for the user to direct. The first mobile device 102 may further accept data entry from the user, including numbers to dial or various parameter values for configuring the operation of the first mobile device 102. The first mobile device 102 may further execute one or more software or firmware applications in response to user commands. These applications may configure the first mobile device 102 to perform various customized functions in response to user interaction. Additionally, the first mobile device 102 may be programmed and/or configured over-the-air, for example from a wireless base station, a wireless access point, or a peer mobile device 104.

The first mobile device 102 may execute a web browser application which enables the display 402 to show a web page. The web page may be obtained via wireless communications with the base transceiver station 106, a wireless network access node, a peer mobile device 104 or any other wireless communication network or system. While two base transceiver stations 106 and 108 are illustrated, it is understood that the wireless communication system may comprise any number of base transceiver stations. In some instances, the first mobile device 102 may be in communication with multiple base transceiver stations 106-108 at the same time. The base transceiver stations 106-108 (or wireless network access node) are coupled to the network 110. Via the wireless link and the network 110, the first mobile device 102 has access to information on various servers, such as the communication server 112. The communication server 112 may provide content which may be shown on the display 402. Alternately, the first mobile device 102 may access the base transceiver stations 106-108 through a peer mobile device 104 acting as an intermediary, in a relay type or hop type of connection.

Figure 5:
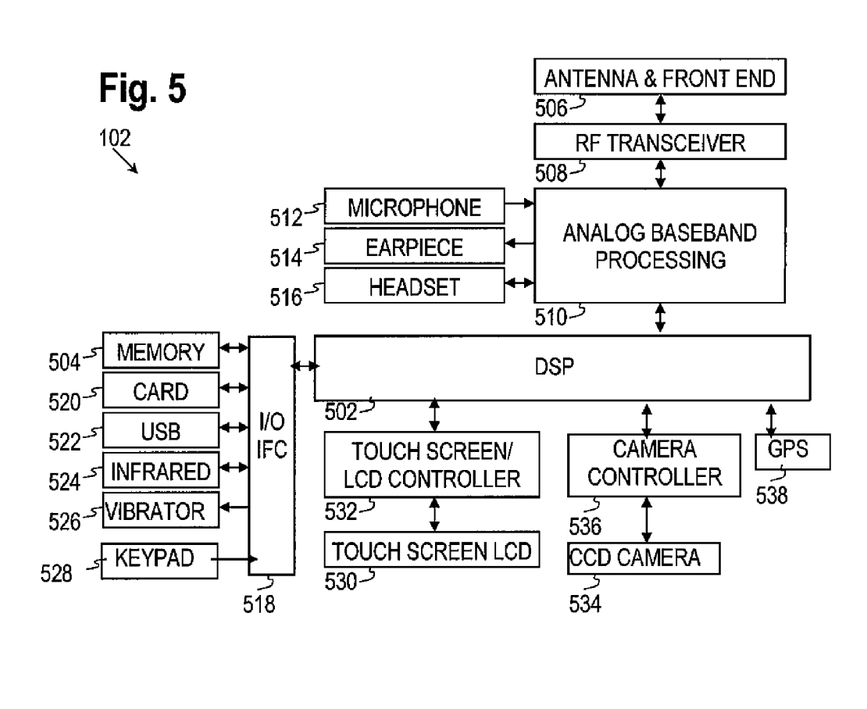
FIG. 5 shows a block diagram of an illustrative mobile device.

FIG. 5 shows a block diagram of the first mobile device 102. While a variety of known components of communication devices 102 are depicted, in an embodiment a subset of the listed components and/or additional components not listed may be included in the first mobile device 102. The first mobile device 102 includes a digital signal processor (DSP) 502 and a memory 504. As shown, the first mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the first mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the first mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the first mobile device 102 to send and receive information from a radio access network (RAN) or some other available wireless communications network or from a peer mobile device 104. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the first mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the first mobile device 102 to function as a peripheral device to exchange information with a personal computer or other computer system. The infrared port 524 and other optional ports such as a Bluetooth interface or an IEEE 802.11 compliant wireless interface may enable the first mobile device 102 to communicate wirelessly with other nearby communication devices 104 and/or wireless base stations.

The input/output interface 518 may further connect the DSP 502 to the vibrator 526 that, when triggered, causes the first mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the first mobile device 102. Another input mechanism may be the touch screen LCD 530, which may also display text and/or graphics to the user. The touch screen LCD controller 532 couples the DSP 502 to the touch screen LCD 530.

The CCD camera 534 enables the first mobile device 102 to take digital pictures. The DSP 502 communicates with the CCD camera 534 via the camera controller 536. The GPS sensor 538 is coupled to the DSP 502 to decode global positioning system signals, thereby enabling the first mobile device 102 to determine its position. In another embodiment, a camera operating according to a technology other than charge coupled device cameras may be employed. Various other peripherals may also be included to provide additional functions, e.g., radio and television reception.

Figure 6:
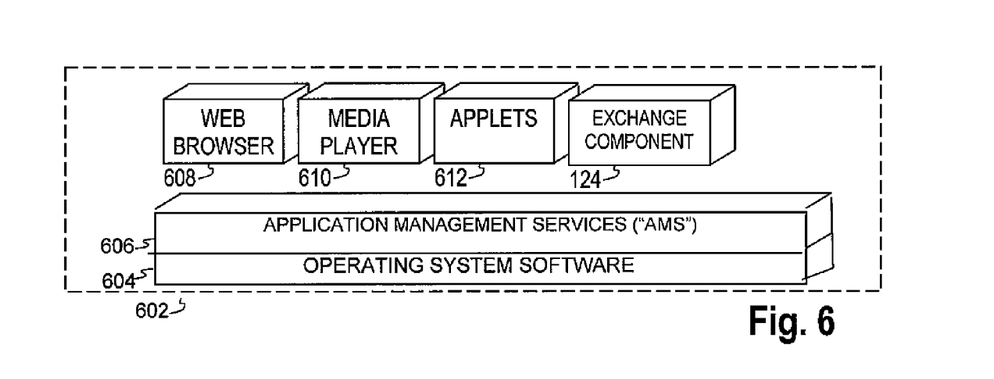
FIG. 6 shows a block diagram of an illustrative software configuration for a mobile device.

FIG. 6 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the first mobile device 102. Also shown in FIG. 6 are a web browser application 608, a media player application 610, JAVA applets 612, and the exchange component 124. The web browser application 608 configures the first mobile device 102 to operate as a web browser, allowing a user to enter information into forms and select links to retrieve and view web pages. The media player application 610 configures the first mobile device 102 to retrieve and play audio or audiovisual media. The JAVA applets 612 configure the first mobile device 102 to provide games, utilities, and other functionality. The first mobile exchange component 124 enables the exchange of push-to-talk contact identifiers following voice calls.

Figure 7:
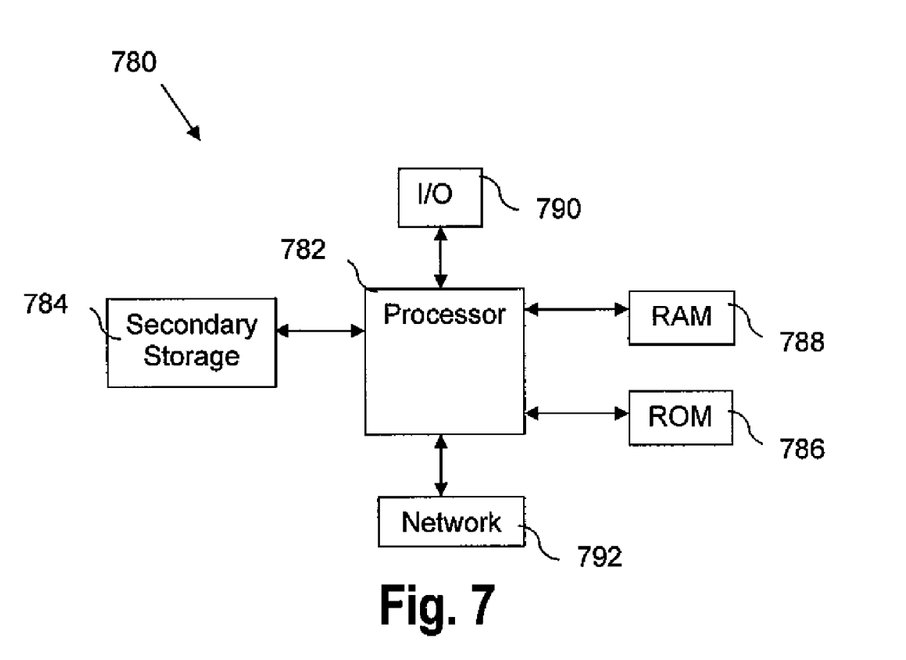
FIG. 7 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 7 illustrates a typical computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for promoting push-to-talk communication, comprising:
    a processor; and
    an exchange component, when executed by the processor, that initiates a push-to-talk contact identifier exchange to enable push-to-talk communications in response to identifying a full-duplex voice call between a first mobile device and a second mobile device, wherein to perform the push-to-talk contact identifier exchange, the exchange component,
        determines whether the first mobile device selects to share a first push-to-talk contact identifier associated with the first mobile device with other mobile devices,
        determines whether the second mobile device selects to share a second push-to-talk contact identifier associated with the second mobile device with other mobile devices in response to a determination that the first mobile device selects to share the first push-to-talk contact identifier with other mobile devices,
        communicates the second push-to-talk contact identifier to the first mobile device in response to a determination that the second mobile device selects to share the second push-to-talk contact identifier with other mobile devices, and
        communicates the first push-to-talk contact identifier to the second mobile device in response to communicating the second push-to-talk contact identifier to the first mobile device.

2. The system of claim 1, wherein the exchange component comprises a first mobile exchange component executed on the first mobile device and a second mobile exchange component executed on the second mobile device.

3. The system of claim 1, wherein the exchange component comprises a server exchange component executed on a communication server.

4. The system of claim 1, wherein at least one of the first mobile device and the second mobile device is one of a mobile phone, a wireless communication device, a pager, a personal digital assistant, a portable computer, a tablet computer, a laptop computer, a digital camera, a digital music player, a digital calculator, an electronic key fob for keyless entry, a media player, and an inventory control device.

5. The system of claim 1, wherein the first push-to-talk contact identifier and the second push-to-talk contact identifier comprise an urban fleet market identifier (UFMID).

6. The system of claim 1, wherein the exchange component communicates at least one of the first push-to-talk contact identifier and the second push-to-talk contact identifier via a data session.

7. The system of claim 1, wherein the exchange component communicates at least one of the first push-to-talk contact identifier and the second push-to-talk contact identifier as a short message service (SMS) message via a mobile device wireless paging channel.

8. The system of claim 1, wherein the first push-to-talk contact identifier and the second push-to-talk contact identifier enable push-to-talk communication via a first technology network, the voice call is communicated via a second technology network, and wherein the first technology network and the second technology network comprise different technology networks.

9. The system of claim 8, wherein the first technology network communicates via one of an integrated digital enhanced network (IDEN) communication technology, a code division multiple access (CDMA) technology, and a voice-over Internet Protocol (VoIP) technology.

10. The system of claim 8, wherein the second technology network communicates via one of a code division multiple access (CDMA) technology, a global system for mobile communication (GSM) technology, an universal mobile telecommunications system (UMTS) technology, and a worldwide interoperability for microwave access (WiMAX) technology.

11. The system of claim 1, wherein the exchange component further promotes a user interface on the first mobile device to display a message about the receipt of the second push-to-talk contact identifier.

12. The system of claim 11, wherein the message indicates one of a prior receipt of the second push-to-talk contact identifier and a request to identify the second push-to-talk contact identifier.

13. A computer implemented method for promoting push-to-talk communication, comprising:
    intercepting a connection request associated with an entered number for a full-duplex voice call from a first mobile device to a second mobile device; and
    in response to said intercepting, promoting use of push-to-talk communications by,
        determining whether the first mobile device is associated with a first push-to-talk contact identifier and the second mobile device is associated with a second push-to-talk contact identifier;
        providing an option to the first mobile device to communicate with the second mobile device via the second push-to-talk contact identifier in response to a determination that the first mobile device is associated with the first push-to-talk contact identifier and the second mobile device is associated with the second push-to-talk contact identifier;
        determining whether the option is selected; and
        communicating with the second mobile device via the second push-to-talk contact identifier in response to a determination that the option is selected.

14. The computer implemented method of claim 13, further comprising connecting to the entered number in response to a determination that at least one of the first mobile device is not associated with the first push-to-talk contact identifier and the second mobile device is not associated with the second push-to-talk contact identifier.

15. The computer implemented method of claim 14, further comprising connecting to the entered number in response to a determination that the option is not selected.

16. The computer implemented method of claim 15, wherein intercepting the connection request associated with the entered number comprises determining whether the entered number is associated with a specified set of numbers associated with at least one of emergency services, customer service for the communication device, and any numbers specified by a user of the communication device for bypassing provision of the option, and wherein determining whether the first mobile device is associated with 17. A system for promoting push-to-talk communication, comprising:
    a processor; and
    an exchange component, when executed by the processor, that initiates a push-to-talk contact identifier exchange to enable push-to-talk communications in response to identifying a full-duplex voice call between a first mobile device and a second mobile device, wherein to perform the push-to-talk contact identifier exchange, the exchange component,
        prompts the second mobile device to select to share a second push-to-talk contact identifier associated with the second mobile device with the first mobile device,
        determines whether the second mobile device selects to share the second push-to-talk contact identifier with the first mobile device,
        prompts the first mobile device to select whether to share a first push-to-talk contact identifier associated with the first mobile device with the second mobile device in response to a determination that the second mobile device selects to share the second push-to-talk contact identifier with the first mobile device,
        determines whether the first mobile device selects to share the first push-to-talk contact identifier with the second mobile device in response to prompting the first mobile device to select whether to share the first push-to-talk contact identifier with the second mobile device,
        communicates the second push-to-talk contact identifier to the first mobile device in response to a determination that the first mobile device selects to share the first push-to-talk contact identifier with the second mobile device, and
        communicates the first push-to-talk contact identifier to the second mobile device in response to communicating the second push-to-talk contact identifier to the first mobile device, wherein the second push-to-talk contact identifier is stored in a contact list for the first mobile device in response to communicating the second push-to-talk contact identifier to the first mobile device, wherein the contact list comprises a plurality of push-to-talk communication levels.

18. The system of claim 17, wherein the plurality of push-to-talk communication levels comprise a push-to-talk communication level associated with routing incoming push-to-talk communications as a voice communication to a mobile device speaker.

19. The system of claim 18, wherein the plurality of push-to-talk communication levels comprise a push-to-talk communication level associated with routing incoming push-to-talk communications as a voice communication to a second mobile device speaker.

20. The system of claim 19, wherein the plurality of push-to-talk communication levels comprise a push-to-talk communication level associated with routing incoming push-to-talk communications as at least one of an audio signal to the second mobile device speaker, a vibration signal to a mobile device vibrator, and a voice communication to a mobile device voice mail storage.

* * * * *

UNITED STATES PATENT AND TRADEMARK OFFICE
CERTIFICATE OF CORRECTION

| | | |
|---|---|---|
| PATENT NO. | : 8,180,386 B1 | Page 1 of 1 |
| APPLICATION NO. | : 12/494025 | |
| DATED | : May 15, 2012 | |
| INVENTOR(S) | : Jason R. Delker, Michael A. Gailloux and Kenneth W. Samson | |

It is certified that error appears in the above-identified patent and that said Letters Patent is hereby corrected as shown below:

IN THE CLAIMS:

Col. 20, Claim 16, line 2 – after the word "with" add

"the first push-to-talk contact identifier and the second mobile device is associated with the second push-to-talk contact identifier is in response to a determination that the entered number is not associated with the specified set of numbers."

Signed and Sealed this
Second Day of October, 2012

David J. Kappos
*Director of the United States Patent and Trademark Office*